United States Patent [19]

Norman et al.

[11] 4,432,289

[45] Feb. 21, 1984

[54] FURNACE BRICK TIE BACK ASSEMBLY

[76] Inventors: Deumite Norman, P.O. Box 14849, Baton Rouge, La. 70808; James P. Brannagan, 2120 N. Airline Hwy., Gonzales, La. 70737; Wesley McLane, Rte. 1, Box 485H-1, Prairieville, La. 70769

[21] Appl. No.: 286,341

[22] Filed: Jul. 23, 1981

[51] Int. Cl.³ .................... F23M 5/00; E04B 1/62
[52] U.S. Cl. .................................. 110/336; 110/338; 52/410; 266/285; 432/248
[58] Field of Search .............. 110/338, 339, 340, 336; 432/248, 251, 252; 266/285, 286; 52/405, 410

[56] References Cited

U.S. PATENT DOCUMENTS

| 15,832 | 9/1856 | Wells | 432/251 |
| 1,738,527 | 12/1929 | Dobie | 432/252 |
| 2,598,474 | 5/1952 | Weaver | 432/251 |
| 3,523,395 | 8/1970 | Rutter et al. | 52/410 |
| 3,676,973 | 7/1972 | Kellert | 52/410 |
| 3,742,670 | 7/1973 | Byrd, Jr. | 110/336 |
| 4,018,023 | 4/1977 | Anderson | 52/410 |
| 4,030,261 | 6/1977 | Coleman | 52/410 |

FOREIGN PATENT DOCUMENTS

| 796302 | 6/1958 | United Kingdom | 110/336 |
| 1359291 | 7/1974 | United Kingdom | 110/336 |

Primary Examiner—Henry C. Yuen

[57] ABSTRACT

A tie back assembly for holding in place loose bricks forming an interior furnace wall is disclosed comprising a hold back plate, an adjustable stud holder assembly attachable at one end to the plate and extending through the furnace wall, and a locking means positioned outside the furnace for securely fixing the plate against the loose bricks.

3 Claims, 3 Drawing Figures

FURNACE BRICK TIE BACK ASSEMBLY

BACKGROUND OF THE INVENTION

1. Field of the Invention

This invention relates to methods and apparatus for holding in place loose bricks which form part of an interior furnace wall.

2. Prior Art

A conventional reformer furnace wall is constructed having steel wool or other insulating material sandwiched between an interior brick wall attached to an exterior steel plate wall by steel straps welded to the interior surface of the steel plate wall.

Typically, these furnaces are operated at 3,000° F. which, after prolonged use, causes the brick mortar to deteriorate resulting in loose bricks and, if uncorrected, structural failure in the steel plate wall. For these reasons, the furnace industry has expended much time, money and effort in the development of methods and apparatus for temporarily holding the lossened bricks in place until it is time to replace the entire interior brick wall. At present the best method devised is to weld a stainless steel stud to the steel plate wall and then attach a steel plate to the stud which covers the loose bricks. However, the intense heat of the furnace very quickly results in weld failure thus rendering the tie back assembly useless. Some improvements to this assembly have resulted in the use of ceramic materials for the steel tip and hold back plate. However, weld failures still occur too frequently.

Another problem with the present tie back assemblies is the difficulty and expense of welding the studs and plates in position.

SUMMARY OF THE INVENTION

Therefore, it is an object of this invention to provide a tie back assembly that is easy to install, yet which secures loosened furnace wall bricks for prolonged periods.

Another object of this invention is to provide a tie back assembly that does not fail during operation of the furnace.

Other objects and advantages will become apparent from the ensuing descriptions of the invention.

Accordingly, a tie back assembly for holding in place a loosened brick forming part of an interior furnace wall is provided comprising a hold back plate; a holder assembly having a stud shaft attachable at one end to the plate, a hollow sleeve member through which the shaft can pass, and a means fixing the position of the shaft in the sleeve; and a locking means operationally connectable to the shaft for fixing the plate against the loosened brick.

PREFERRED EMBODIMENTS OF THE INVENTION

Figure 1:
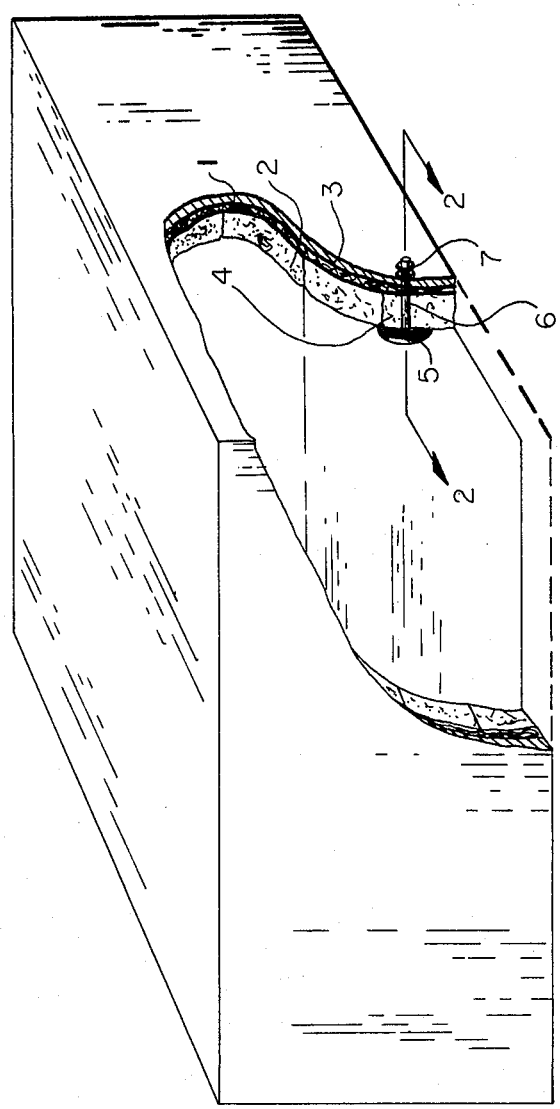
FIG. 1 is a three dimensional cutaway view of a preferred embodiment of the tie back assembly in use on a typical reformer furnace wall.

Referring to the Figures, a conventional reformer furnace wall is illustrated showing steel wool insulating layer 1 sandwiched between the interior brick wall 2 and the exterior steel plate wall 3. Holding a loosened brick 4 in positioning is the tie back assembly comprising broadly hold back plate 5, holder assembly 6 and locking means 7.

Figure 2:
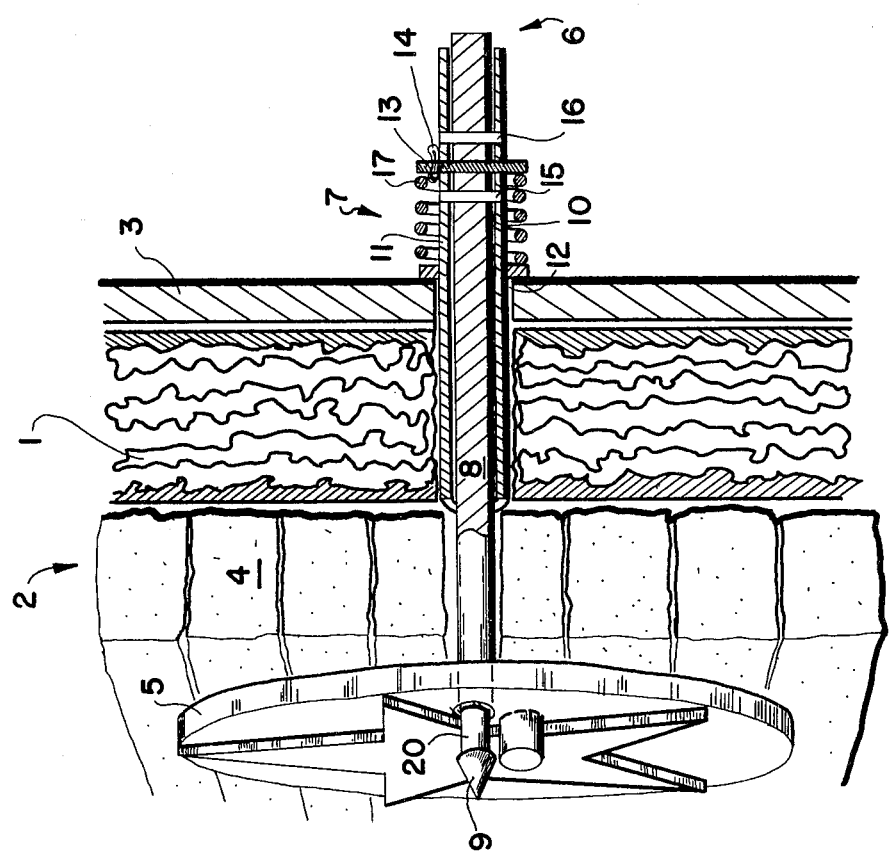
FIG. 2 is a cross-sectional view of the tie back assembly taken along lines 2—2 of FIG. 1.

Turning now to FIG. 2, a preferred embodiment of holder assembly 6 is illustrated. It comprises a stud shaft 8 attachable as described below at one end 9 to hold back plate 5 and passes through passageway 10 of hollow sleeve member 11. The sleeve member protrudes through steel wall opening 12 and extends perpendicularly outward from the exterior of the furnace. To fix the position of shaft 8 relative to sleeve member 11, pin 13 having stop means 14 (such as a cotter pin or metal ridge) is inserted through one of a series of sleeve members openings 15 and one of a series of shaft openings 16 aligned with the sleeve member opening 15. However, before pin 13 is inserted, coil spring 17 is fitted about sleeve member 11 and abutted against steel plate wall 3 as shown.

Figure 3:
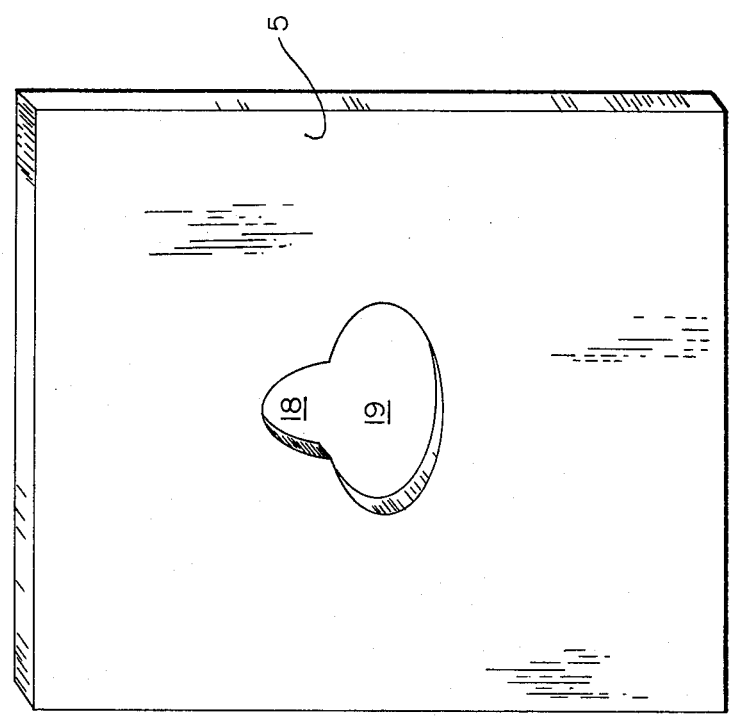
FIG. 3 is a frontal view of the hold back plate.

In a preferred embodiment as seen in FIGS. 2 and 3, hold back plate is constructed with two overlapping openings 18 and 19 of different diameters and extending preferably through the center of plate 5. In this same embodiment, shaft end 9 is provided with groove 20 extending around the circumference of end 9. At groove 20, shaft end 9 has a diameter which can pass through both openings 18 and 19 while at other sections of shaft end 9 the diameter is large enough to only permit passage through opening 19.

In another preferred embodiment, both plate 5 and shaft 8 are constructed from ceramic material to prolong wear. Because of the unique design of the tie back assembly, sleeve member 11 can be constructed from stainless steel or similar material. Furthermore, by being able to place the locking means or coil spring 17 outside of the furnace it is not subjected to high temperatures resulting in a significantly prolonged life of the tie back assembly.

In operation, the loosened brick is removed and steel plate wall opening 12 is drilled. Sleeve member 11 is inserted through opening 12 and into the furnace wall no further than the steel wool insulating layer 1. Shaft 8 is inserted into sleeve member 11, the brick 4 replaced, plate 5 locked into shaft 8 by fitting groove 20 into plate opening 18, spring 17 positioned on sleeve member 11 and compressed so that pin 13 can be inserted through the passageway formed by sleeve member opening 15 and shaft opening 16. It is preferred that shaft 8 be positionally fixed with relation to sleeve member 11 so that plate 5 abutts against brick 4.

There are, of course, many embodiments not specifically disclosed but which are intended to be included in this invention as defined by the following claims.

What we claim is:

1. A tie back assembly for holding in place a loosened brick which form part of an interior furnace wall which comprises:
   (a) a hold back plate;
   (b) a holder assembly comprising:
      (i) a stud shaft attachable at one end to said plate; said shaft has a series of shaft openings positioned along its horizontal axis at its end opposite said end, attachable to said plate;
      (ii) a hollow sleeve member through which said shaft can pass, said sleeve fitting through an opening in said wall and extendable past the exterior of said furnace wall; said sleeve member has a series of sleeve openings positioned along its horizontal axis;
(iii) means for fixing the position of said shaft in said sleeve member; said means is a pin that is of length and diameter to allow said pin to pass through both aligned said shaft opening and said sleeve openings; and
(c) a locking means positioned outside the furnace, but operationally connectable to said shaft for fixing said plate against said loosened brick; said locking means comprises a coil spring fitting over said sleeve member and in contact at one end with the exterior furnace wall surface and in contact at its other end with said pin.

2. A tie back assembly according to claim 1 wherein:
(a) said plate has overlapping openings of different diameters extending through said plate; and
(b) said shaft end has an exterior diameter to allow it to pass through only one of said openings, said shaft end having a circular groove of sufficient depth to form the groove section diameter to allow the groove section to pass through said openings.

3. A tie back assembly according to claim 1 wherein said plate and said shaft are constructed from ceramic material.

* * * * *